US007792940B2

(12) United States Patent
Liao et al.

(10) Patent No.: US 7,792,940 B2
(45) Date of Patent: Sep. 7, 2010

(54) REBOOTING VOIP COMMUNICATION DEVICES OVER A PACKET-SWITCHING NETWORK

(75) Inventors: Robert H. Liao, Chestnut Hill, MA (US); Rezwanul Azim, Lexington, MA (US); Elliot Eichen, Arlington, MA (US); Juan Vasquez, Gibsonton, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 806 days.

(21) Appl. No.: 11/613,665

(22) Filed: Dec. 20, 2006

(65) Prior Publication Data

US 2008/0155076 A1      Jun. 26, 2008

(51) Int. Cl.
*G06F 15/173*      (2006.01)
*H04L 12/28*      (2006.01)
(52) U.S. Cl. ........................ 709/223; 370/351
(58) Field of Classification Search ................ 709/204, 709/220–229, 246; 370/270, 465, 477, 351–358, 370/408, 60; 348/211–215, 207; 705/1–5
See application file for complete search history.

(56) References Cited

U.S. PATENT DOCUMENTS

| 7,046,658 | B1 * | 5/2006 | Kundaje et al. | ............. 370/352 |
| 7,046,659 | B1 * | 5/2006 | Woundy | ..................... 370/352 |
| 2006/0239427 | A1 * | 10/2006 | Cooke et al. | ........... 379/114.01 |
| 2007/0171896 | A1 * | 7/2007 | Omori | ........................ 370/352 |
| 2008/0069310 | A1 * | 3/2008 | Berstis et al. | ............. 379/67.1 |
| 2008/0084870 | A1 * | 4/2008 | Taylor et al. | ................ 370/352 |

* cited by examiner

*Primary Examiner*—Nathan Flynn
*Assistant Examiner*—Mark O Afolabi

(57) ABSTRACT

An apparatus is provided for remotely rebooting Voice over Internet Protocol (VoIP) communication devices. In general, the apparatus remotely selects VoIP communication devices connected to a network, reboots the selected devices, and evaluates the status of each device. A processor allows a user to select VoIP communication devices connected to the network and receives inputs pertaining to the reboot operation, including a time input and search criteria. The processor communicates with the designated VoIP communication devices over a packet-switching network to instruct the devices to reboot and monitors each device. In this way, multiple VoIP communication devices may be rebooted from a remote location, and problems or issues that arise during the reboot process may be identified and addressed. An associated method and computer program product are also provided for remotely rebooting VoIP communication devices.

19 Claims, 10 Drawing Sheets

Fig. 5

REBOOTING VOIP COMMUNICATION DEVICES OVER A PACKET-SWITCHING NETWORK

BACKGROUND

Voice over Internet Protocol (VoIP) is a method for converting analog audio signals, such as voice signals, into digital data that can be transmitted over a packet-switching network. In contrast, Time-Division Multiplexing (TDM) is a method for transferring data as sub-channels in one communication channel. In contrast with a TDM system, in which a fixed number of channels with a constant bandwidth per channel are used for circuit mode communication, a VoIP system routes the data in packets along different paths, rather than one dedicated path.

VoIP telephone systems are becoming more prevalent in enterprises, replacing typical TDM telephone systems. In particular, large enterprises with multiple distributed facilities may find huge cost benefits from transporting voice traffic over the existing data network infrastructure through VoIP. In addition to simplified infrastructure, VoIP also presents other advantages over traditional telephone systems, such as the ability to manipulate the voice data and to use a VoIP telephone in multiple locations having access to the network.

VoIP telephone systems also present unique challenges in comparison to traditional telephone systems. VoIP devices generally require more maintenance and monitoring than typical TDM devices. For example, VoIP telephones may need to be rebooted periodically to clear an error condition, re-register with the network, or download updates from a central server.

In a large enterprise distributed across multiple sites, the seemingly simple task of rebooting VoIP devices may involve large logistical costs. For example, if the enterprise chooses to have the users of each VoIP device perform the reboot periodically, such as at the end of each day, the enterprise may have to send out periodic reminders or hold training sessions to educate the users on how to perform this function. Some users will likely forget or choose not to perform the reboot, which may result in problems with the operation of the devices, requiring the time and effort of skilled technicians to resolve.

Even if the users do reboot the devices, many of the users may choose to perform the reboot at the same time, such as the end of the work day, placing a large load on the network as the rebooted devices attempt to re-register themselves with the network. In addition, any problems experienced during the reboot operation may be met with frustration by the user, who will have to call a technician to resolve the problem. Alternatively, even greater costs may be incurred by requiring numerous technicians at each site to manually reboot the VoIP devices, for example by going to each device, turning it off, then turning it on again.

Thus, there is a need for remotely and efficiently rebooting multiple VoIP communication devices in a way that does not overwhelm the network, allows for reboot operations to be scheduled in advance, and monitors the condition of the device before and after the reboot is executed.

BRIEF DESCRIPTION OF THE SEVERAL VIEWS OF THE DRAWING(S)

FIG. 5 shows an example of a confirmation screen generated by execution of a computer program product in accordance with one embodiment;

DETAILED DESCRIPTION OF PREFERRED EMBODIMENT

Exemplary embodiments now will be described hereinafter with reference to the accompanying drawings, in which exemplary embodiments and examples are shown. Like numbers refer to like elements throughout.

Apparatuses and methods for remotely rebooting Voice over Internet Protocol (VoIP) communication devices are provided in accordance with various exemplary embodiments. In general, apparatuses and methods are described for remotely selecting VoIP communication devices connected to a network, rebooting the selected devices, and evaluating the status of each device. The apparatuses and methods may be used, for example, in conjunction with or in addition to the apparatuses and methods provided in U.S. Ser. No. 11/613701, entitled "Apparatus for Remotely Managing Network Elements of a VoIP Communication System and an Associate Method and Computer Program Product", filed concurrently, the content of which is incorporated by reference herein in its entirety.

A processor allows a user to select VoIP communication devices connected to the network and receives inputs pertaining to the reboot operation. The processor communicates with the VoIP communication devices over a packet-switching network to instruct the devices to reboot and monitors each device. In this way, multiple VoIP communication devices may be rebooted from a remote location, and problems or issues that arise during the reboot process may be identified and addressed.

Figure 1:
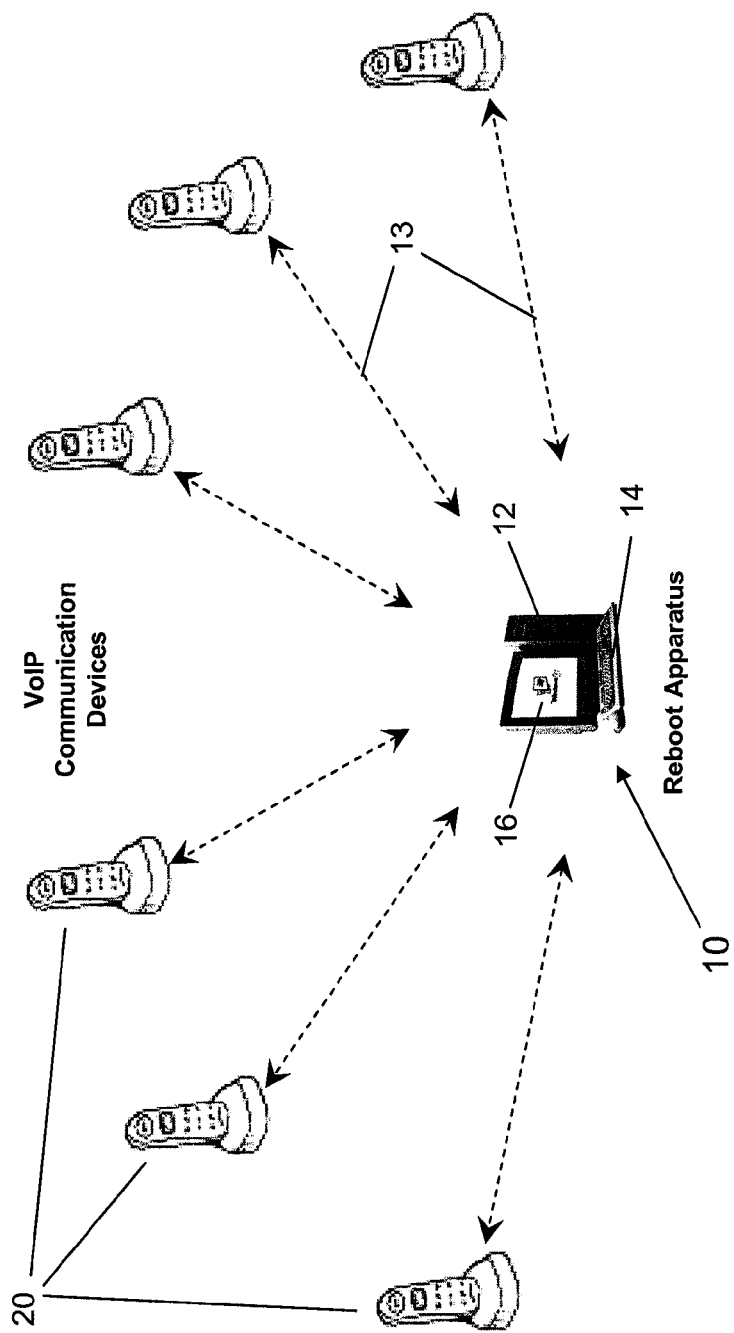
FIG. 1 is a schematic representation of one embodiment of an apparatus for remotely rebooting VoIP communication devices.

Referring to FIG. 1, the apparatus 10 comprises a processor 12 configured to receive inputs from a user and to communicate with a plurality of VoIP communication devices 20 over a packet-switching network, such as the Internet, in accordance with the inputs. The processor may be a microprocessor, a personal computer, or any other computing device capable of performing the functions subscribed to the processor hereinbelow. The VoIP communication devices 20 may be located remotely from the apparatus 10 and from other VoIP communication devices 20. For example, the apparatus 10 may be located in a technology office in a building in one state, while the VoIP communication devices 20 may be located across several offices in the same building and in other buildings in various other locations.

The processor 12 is configured to receive at least one input designating at least one of the VoIP communication devices 20 connected to the network and to instruct the designated VoIP communication devices 20 to reboot based on the input. The input may be received by the processor 12 via an input device 14, such as a keyboard, as shown in FIG. 1, or a mouse. For example, a user, such as a technician, may provide information to the processor 12 designating one or more connected VoIP communication devices 20 by typing an identifying name or number of the device using a keyboard.

Figure 2:
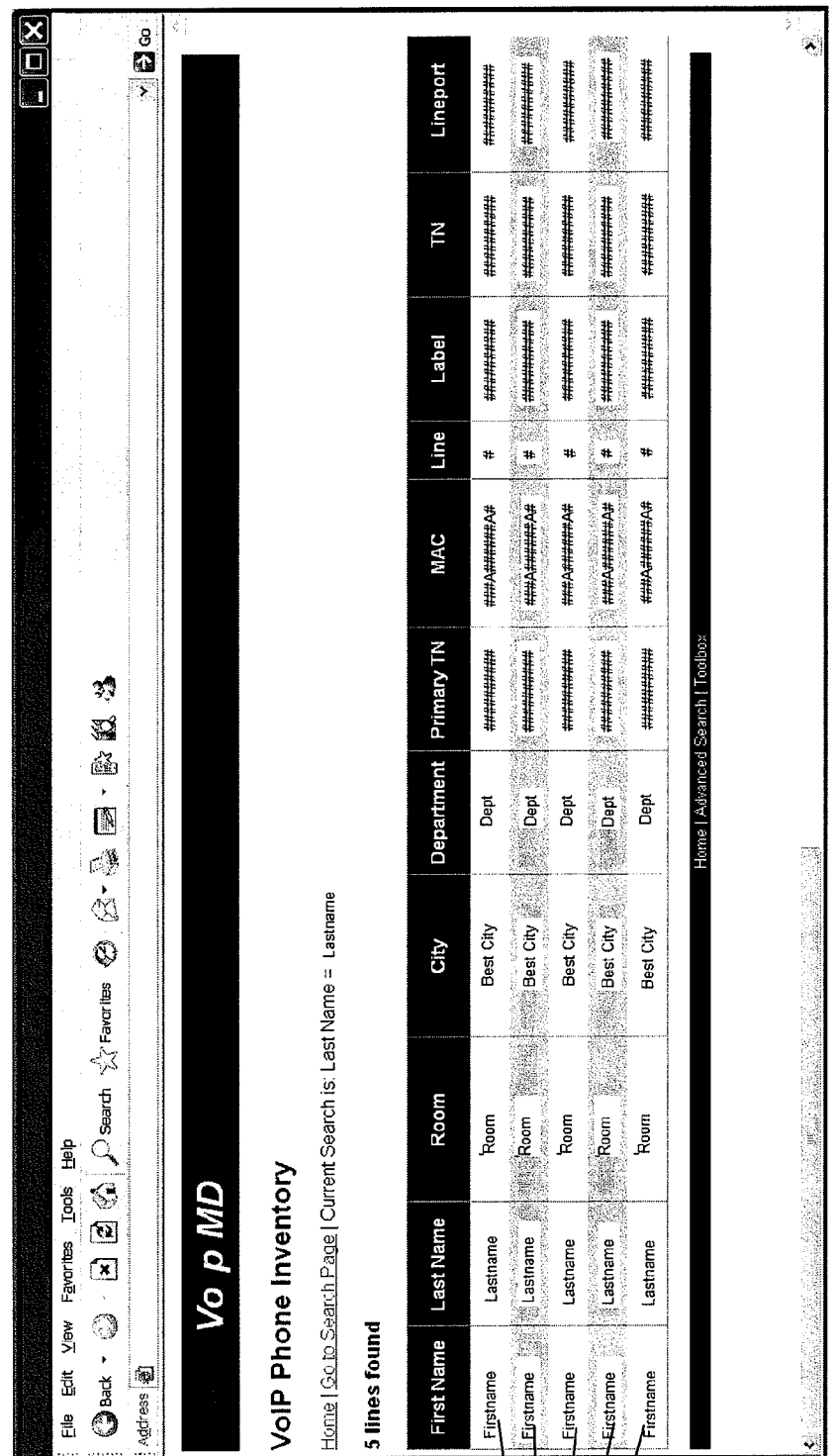
FIG. 2 shows an example of a screen listing sensed VoIP communication devices and associated information generated by execution of a computer program product in accordance with one embodiment.

Alternatively, the processor 12 may be configured to sense the VoIP communication devices 20 connected to the network, obtain information associated with each of the devices 20 sensed, and store a list of the devices 20 sensed along with the associated information. For example, the processor 12 may transmit signals 13 over the network requesting identifying information from the VoIP communication devices 20 connected to the network. Based upon the identifying information provided by the VoIP communication devices 20, the processor 12 may display the list of sensed VoIP communication devices 20 and the associated information on a screen of a monitor 16, as illustrated in FIG. 2. The information may be arranged in any manner, and the arrangement of the information may be configurable by a user as necessary. For example, the processor 12 may display the information in the form of a table 30, displaying an entry 32 for each sensed device 20. Alternatively, a VoIP communication device 20, similar to a conventional telephone, may have more than one available "line" for communicating with other communication devices. In this case, the processor 12 may be configured to display an entry 32 for each line of each sensed device 20.

In the case where the processor 12 displays the VoIP communication devices 20 sensed, the processor 12 may receive an input selecting one of the displayed devices to be rebooted. For example, the processor 12 may generate a window 34 to display a table 30 of VoIP communication devices 20 and associated information on the screen of the monitor 16 and allow the user to designate one or more of the devices 20 by putting a checkmark in a checkbox associated with each device 20. Or, the processor 12 may allow the user to highlight one or more entries 32 associated with a VoIP communication device 20 using an input device 14, such as a mouse.

The associated information obtained, stored, and/or displayed by the processor 12 may describe various aspects of the VoIP communication devices 20. For example, the associated information may include the first and last name of an associated user of the respective device 20, physical location of the device 20 (e.g., room number, department, building), Media Access Control (MAC) address, designation of the line or lines associated with the device 20, label, telephone number, Internet Protocol (IP) address, Session Initiation Protocol (SIP) registration information, device or other identifiers, configurations, phone logs, hardware and software descriptions, and any other information capable of being associated with the device 20 and transmitted to the apparatus 10.

Figure 3:
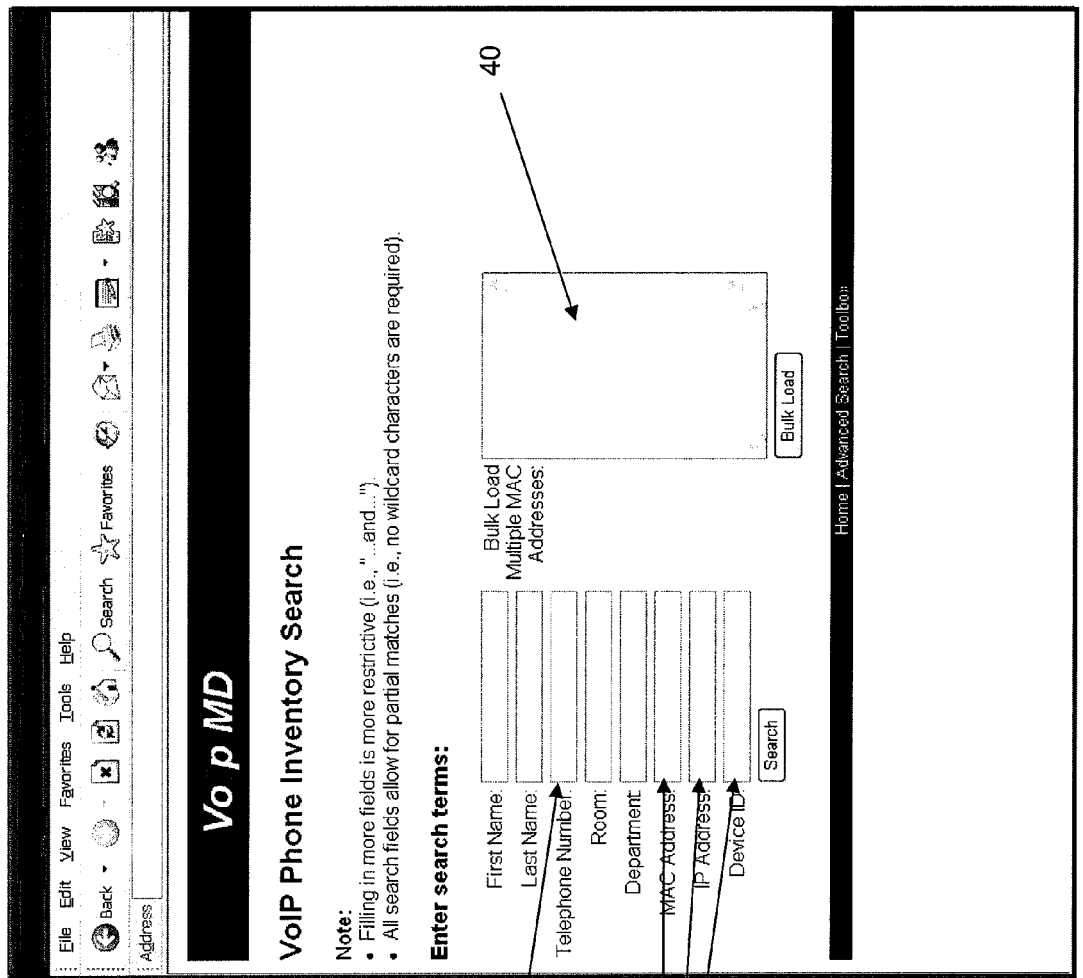
FIG. 3 shows an example of a search criteria input screen generated by execution of a computer program product in accordance with one embodiment.

The processor 12 may also be configured to receive and respond to a search criteria input provided by a user. For example, the processor 12 may generate a window 34 on the screen of a monitor 16 displaying various fields 36 that may be filled in by a user via an input device 14 to provide criteria for a search, as shown in FIG. 3. The processor 12 may then use the criteria provided to search the entries 32 for information regarding the VoIP communication devices 20 that matches the criteria provided and to display the results of the search. For example, a user may enter the telephone number of a VoIP communication device 20 of interest in a field marked "telephone number" 38. In response to the input of this criteria, the processor 12 would search the information previously obtained and stored and would display the entry 32 or entries containing the telephone number specified in the search.

The processor 12 may also provide a field 40 for inputting multiple criteria at one time. For example, if a user is searching for ten VoIP communication devices 20 with known MAC addresses, the MAC addresses for all ten devices 20 may be entered in the field 40, and the devices 20 matching the search criteria would be displayed. As previously mentioned, any of the information captured by the processor 12, including the location, associated user, telephone number, IP address, and MAC address of the VoIP communication device 20 may be used as search criteria.

Figure 4:
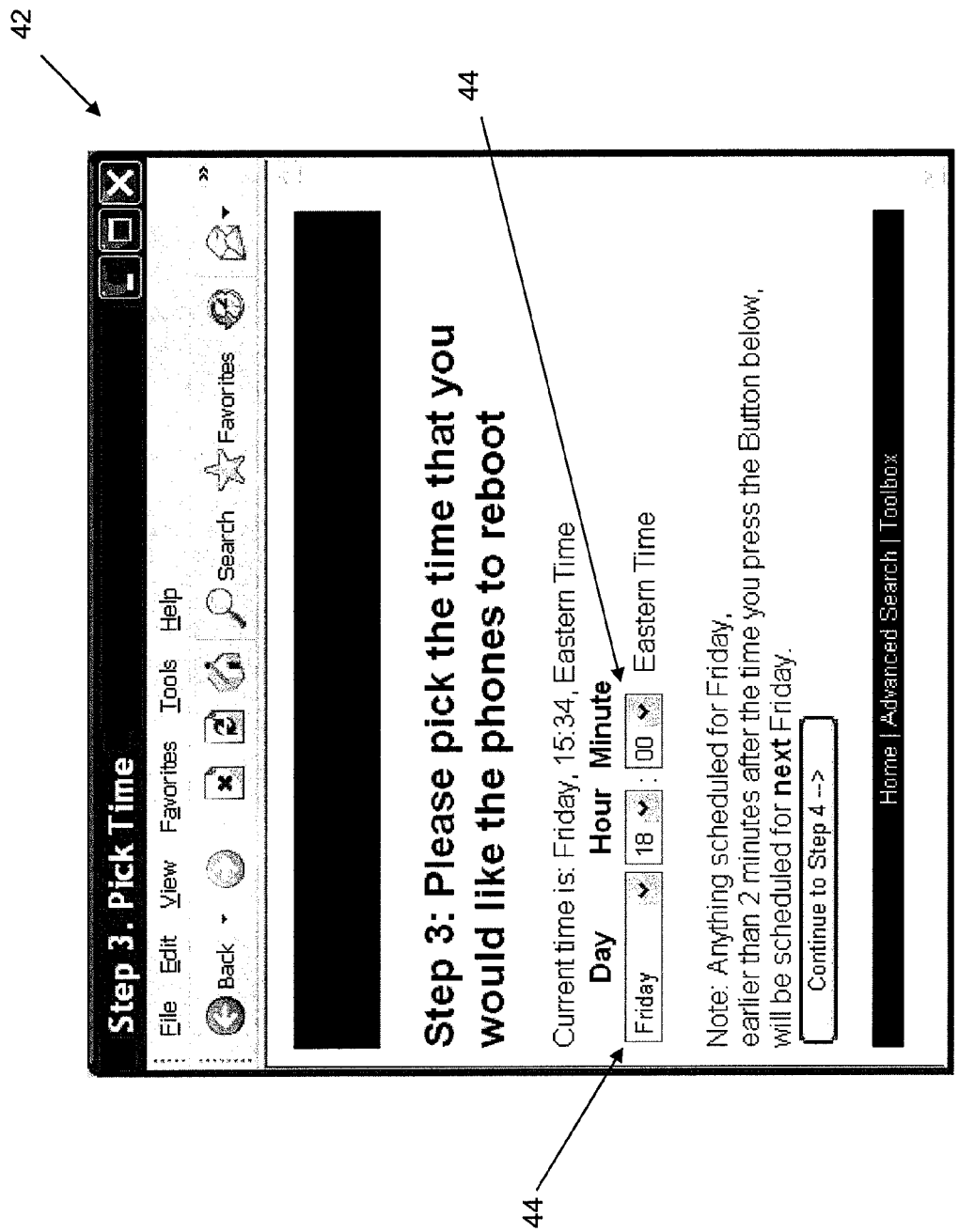
FIG. 4 shows an example of a time input screen generated by execution of a computer program product in accordance with one embodiment.

The reboot operation may be executed by the designated VoIP communication devices 20 at the time the devices 20 are designated, or at a later time according to a time input provided by the user. Thus, the processor 12 may be configured to receive a time input to define a time to reboot each designated VoIP communication device. For example, the processor 12 may display a screen 42 as shown in FIG. 4 with fields for receiving a day 44 and time 46 for executing the reboot operation. The screen 42 may be displayed, for example, after the VoIP communication devices 20 have been designated to receive reboot instructions. Once a user has defined a time for the reboot operation to be executed, the processor 12 may store the information for rebooting each designated VoIP communication device at the defined time. In this way, at the time specified by the user, the processor 12 will cause the previously designated VoIP communication devices 20 to execute the reboot operation automatically, without further input from the user.

The processor 12 may be configured to allow multiple reboot operations to be scheduled for various VoIP communication devices 20. For example, one batch of VoIP communication devices 20 may be scheduled for reboot on one day, another batch may be scheduled for the following morning, and another batch for the following afternoon. The processor 12 may be configured to display a list of the scheduled reboots on the monitor 16 and may also be configured to receive a cancellation input deleting one or more of the scheduled reboots. In this way, a technician, for example, may be able to view a list of the VoIP communication devices 20 scheduled to be rebooted. In this example, the technician may then delete half of the VoIP communication devices 20 included in the first batch scheduled to be rebooted, for example, and reschedule the reboot operations for another time, if necessary.

Figure 5:
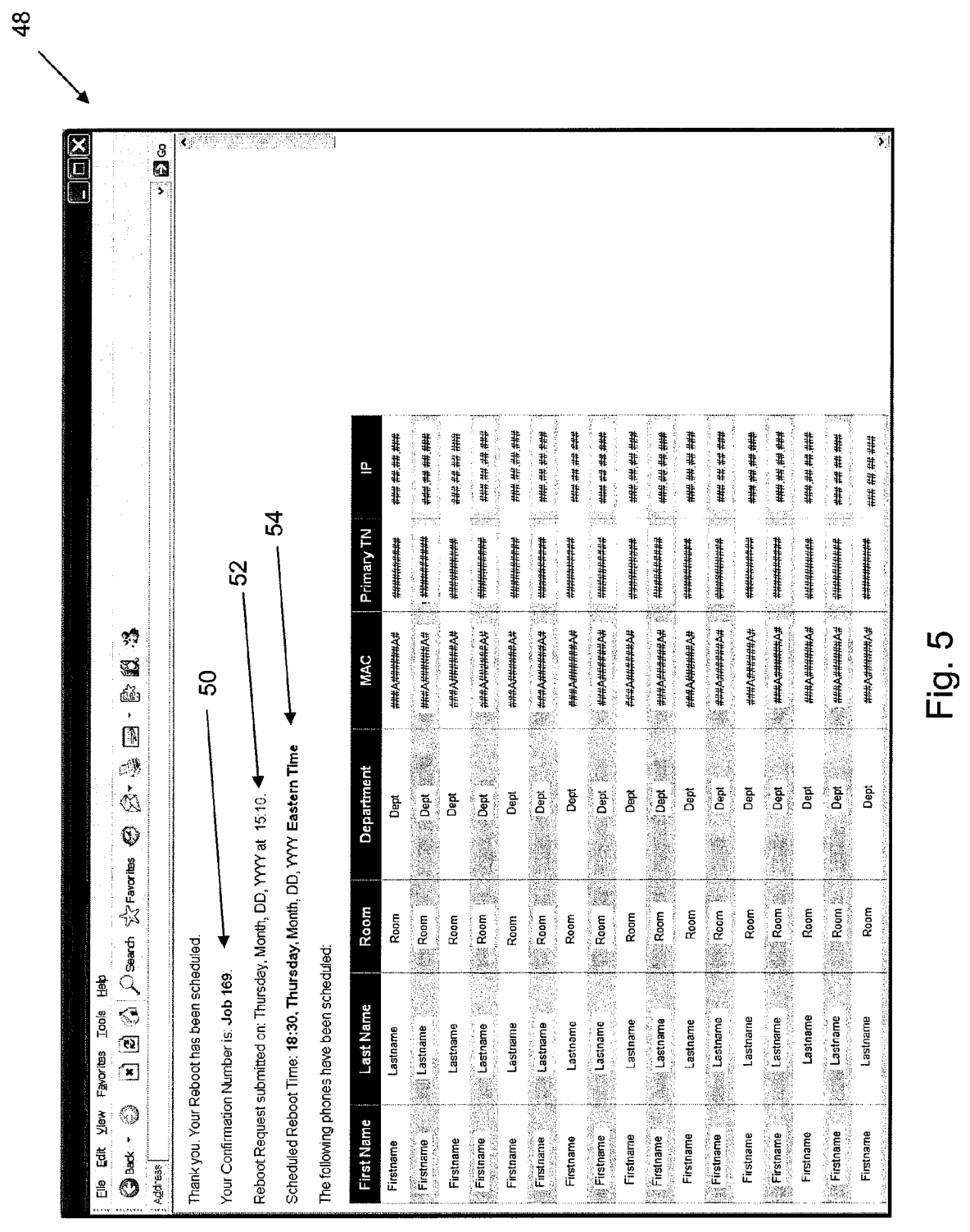

The processor 12 may similarly provide a confirmation to the user that the reboot has been scheduled. An example of a reboot confirmation screen 48 is shown in FIG. 5. The reboot confirmation may be displayed by the processor 12 immediately following the scheduling of a reboot operation, or the confirmation may be provided in the form of an e-mail or text message. The confirmation may include various information regarding the scheduled reboot operation, which may include a confirmation number 50, the date and time the operation request was submitted 52, the time scheduled for the reboot operation 54, and the VoIP communication devices 20 involved, along with the associated information for those devices 20.

The processor 12 may also be configured to stagger the reboots of the VoIP communication devices 20, for example when more than a certain number of VoIP communication devices 20 are to be rebooted at the same time. For example, a technician may designate 100 VoIP communication devices 20 to be rebooted at midnight. However, the network supporting the VoIP communication devices 20 may only be capable of allowing fifty VoIP communication devices 20 to register on the network at any given time. In this example, an attempt by more than fifty VoIP communication devices 20 to register simultaneously may result in failed registrations by some or all of the registering devices 20. Thus, the processor 12 may be configured to delay the reboot operation of some of the scheduled VoIP communication devices 20 to allow time for the first devices 20 rebooted to register themselves on the network before rebooting the next batch. In the previous example, although 100 VoIP communication devices 20 were scheduled to be rebooted at the same time, 12:00:00 A.M., the processor 12 may be configured to reboot one device 20 every 18 seconds beginning at 12:00 A.M., thus evenly distributing the reboots over a 30-minute period. In that way, the 100 devices 20 should not overwhelm the network of this example with simultaneous requests to register following the reboot operation.

The processor 12 may be configured to notify a user that a reboot operation is starting. For example, a technician may schedule a reboot operation to be executed by fifty VoIP communication devices 20 at 6:00:00 P.M. on the following day. The processor 12 may be configured to send the technician who scheduled the operation, or another technician designated by the scheduling technician, a notification when the reboot operation is about to begin. For example, the processor 12 may generate an e-mail, text message, or voice message that is sent to the recipient technician at 5:55:00 P.M. informing the technician that the reboot operation on the designated VoIP communication devices will begin in five minutes. The processor 12 may also send the notification to each user associated with the VoIP communication device 20 scheduled to be rebooted. For example, the employee associated with a particular VoIP communication device 20 may be notified as to when the reboot operation is scheduled to begin so that the employee is not surprised by the execution of the operation or does not plan to use the device 20 at the same time the operation is to be executed.

The notification may include a simple statement identifying the scheduled reboot operation and the time the operation is to be executed, or the notification may also include details regarding the VoIP communication devices 20 that were designated for executing the reboot operation and provide the recipient of the notification with further options. For example, the notification may provide a recipient technician the option of canceling the scheduled reboot for all listed VoIP communication devices 20, deleting one or more of the devices 20 scheduled to execute the operation, or designating additional devices 20. As another example, a notification sent to the employee associated with one of the scheduled VoIP communication devices 20 may provide the employee the option of canceling the scheduled reboot for his or her particular device 20 if, for example, the employee wishes to avoid interruption of an important business call that is to take place during the scheduled time.

Figure 6:
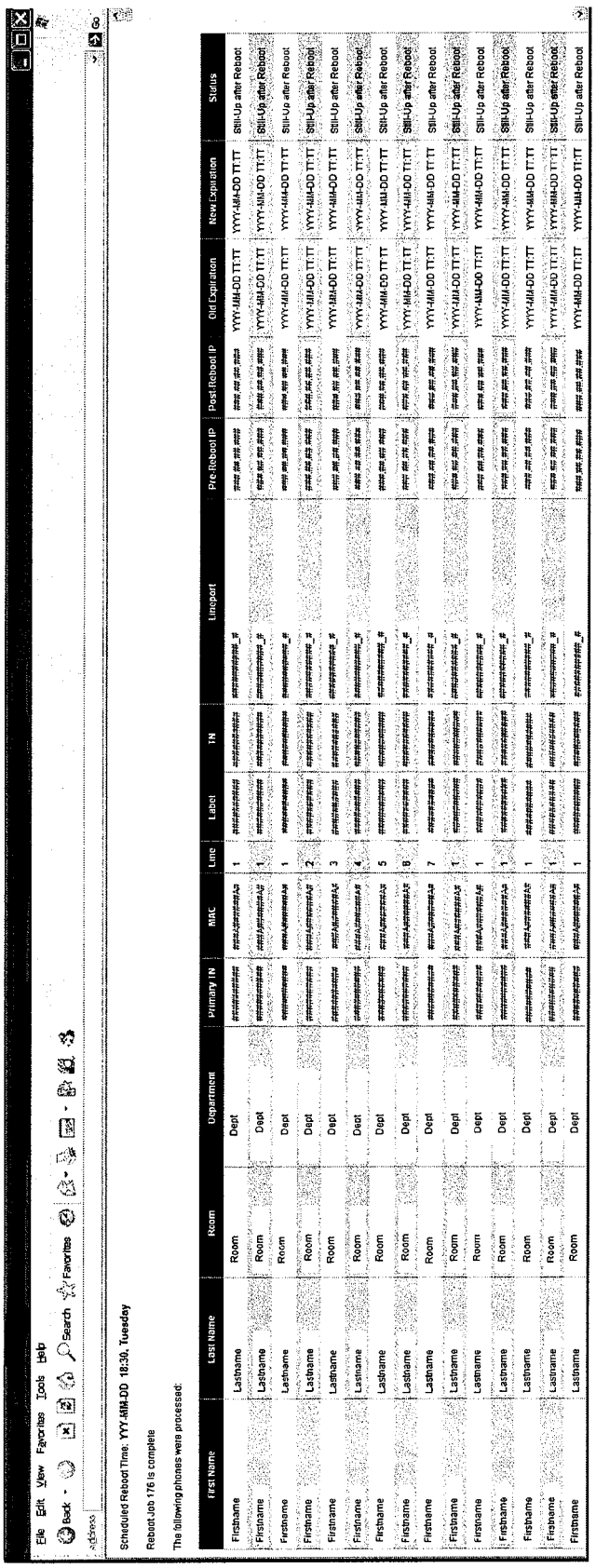
FIG. 6 shows an example of a report screen generated by execution of a computer program product in accordance with one embodiment.
Figure 7:
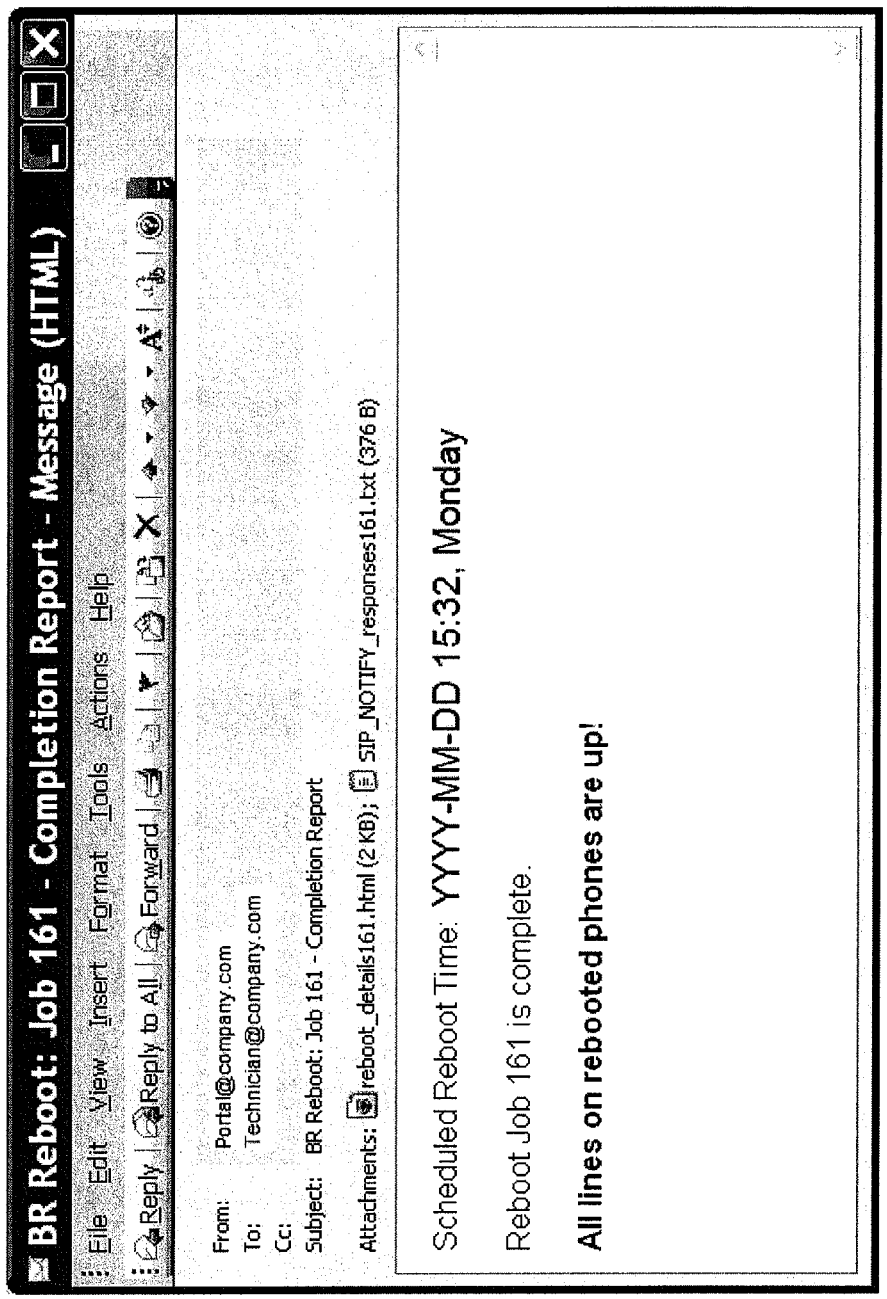
FIG. 7 shows an example of an e-mail report generated by execution of a computer program product in accordance with one embodiment.

In some embodiments, the processor 12 may be configured to detect and report a condition of the VoIP communication device before and/or after the reboot is executed. The processor 12 may, for example, detect and report whether a particular VoIP communication device 20 is connected to the network, whether any errors are detected in the device 20, and, if so, what kind of errors are detected. For example, the processor 12 may be configured to communicate with the VoIP communication devices 20 scheduled to be rebooted prior to the rebooting, such as five minutes before the devices 20 are rebooted. Similarly, the processor 12 may be configured to communicate with the VoIP communication devices 20 after the reboot operation is executed, for example five minutes after the reboot operation is executed. The report containing the conditions detected, before or after the reboot, may be displayed by the processor 12 as another screen 56, illustrated in FIG. 6, or the report may be in the form of an e-mail 58 or other message that is sent to a designated recipient, illustrated in FIG. 7.

Figure 8:
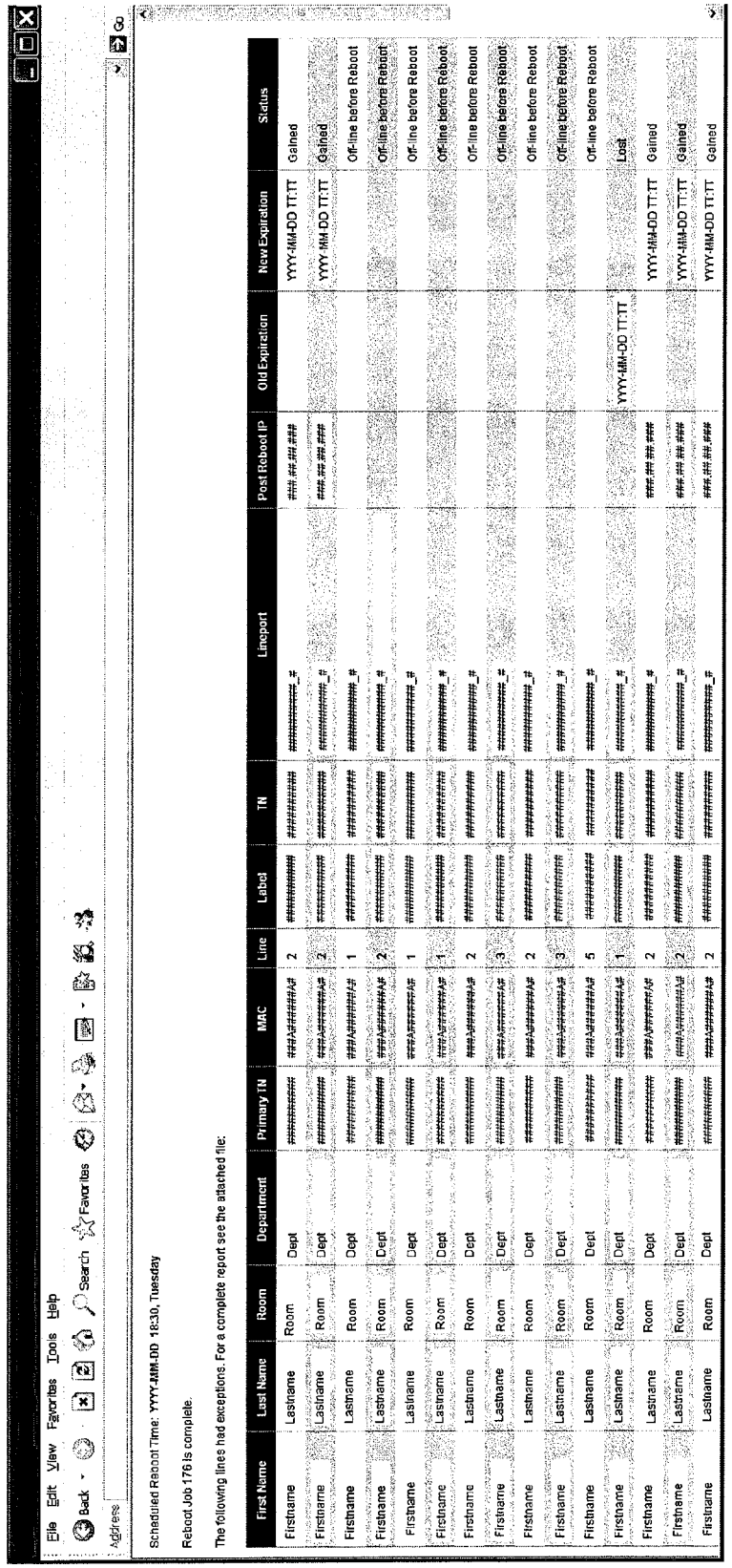
FIG. 8 shows an example of an exception report screen generated by execution of a computer program product in accordance with one embodiment.

The processor 12 may also be configured to generate an exception report 60 listing any of the designated VoIP communication devices 20 that did not successfully execute the reboot operation, as illustrated in FIG. 8. In this way, a technician, for example, may analyze the devices 20 failing to reboot in an attempt to resolve any problems. In addition to or instead of generating an exception report detailing the VoIP communication devices failing to reboot, the processor 12 may be configured to again attempt to reboot the designated, but un-rebooted, VoIP communication devices 20 automatically in an attempt to rectify the situation. The processor 12 may be configured, for example, to attempt a scheduled reboot operation three times before notifying the technician that the reboot failed.

Figure 9:
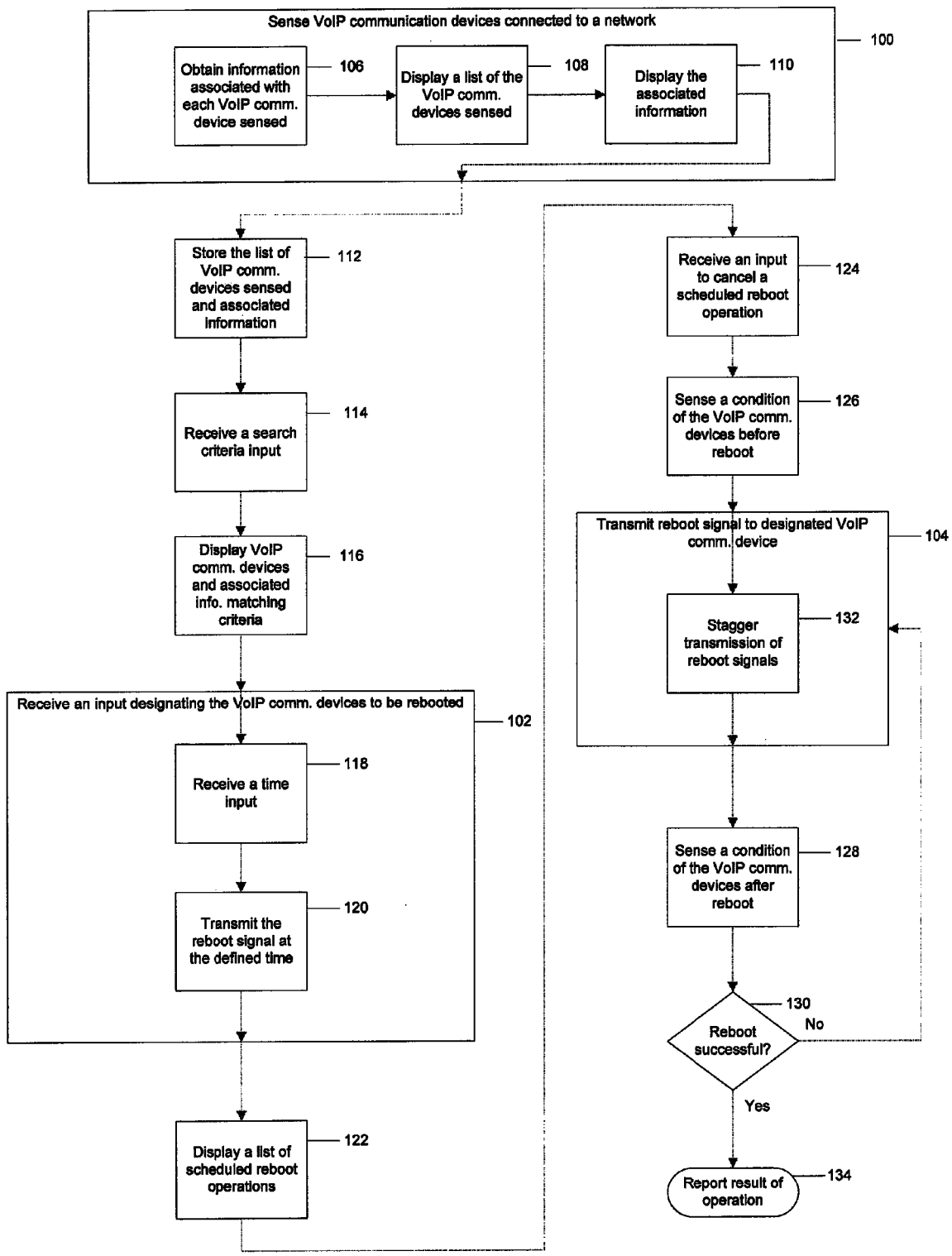
FIG. 9 is a flow chart illustrating embodiments of a method of remotely rebooting VoIP communication devices.

In other embodiments, a method for remotely rebooting VoIP communication devices 20 is provided. Referring to FIG. 9, at least one VoIP communication device 20 that is connected to a network, such as a private IP network or the Internet, is initially sensed. An input is then received designating one or more of the VoIP communication devices 20 sensed to be rebooted, and a reboot signal is transmitted to the designated devices 20 instructing each device 20 to reboot. See FIG. 9, blocks 100-104.

As the VoIP communication devices 20 are sensed, information associated with each VoIP communication device 20 that is sensed may also be obtained. Such information may include the physical and network location of the device 20, the associated user, the IP address, and the telephone number, among many other items of information. A list of the VoIP communication devices 20, as well as the associated information, may then be displayed, for example in tabular form in a window displayed on a monitor. See blocks 106-110.

The VoIP communication devices 20 that are sensed, along with the associated information for each device 20, may be stored for later display, as shown in block 112. A search criteria input may be received, and the VoIP communication devices 20 and associated information matching all or part of the search criteria may then be displayed. See blocks 114-116. For example, a technician may provide a search criteria input of a particular department of an enterprise in which the VoIP communication device 20 is located. As a result, any VoIP communication devices 20 that are listed as located in the particular department should be displayed, along with the associated information for each of the VoIP communication devices 20 returned by the search.

In addition to inputs designating the VoIP communication devices 20 to be rebooted and specifying search criteria, other inputs may also be received. A time input may be received defining a date and a time to transmit the reboot signal. For example, a technician may schedule a reboot operation to be executed by designated VoIP communication devices 20 at a later time, rather than immediately following the designation of the devices 20. In this case, an input defining the date and time to transmit the reboot signal would be received, and the reboot signal would be transmitted to the designated VoIP communication devices 20 on the defined date at the defined time. See blocks 118-120.

In the case that multiple VoIP communication devices 20 are scheduled to be rebooted at the same time, or multiple batches of VoIP communication devices 20 are scheduled to be rebooted at different times, a list of the scheduled reboot transmissions may be displayed, as shown in block 122. Such list may include the VoIP communication devices 20 designated to receive the reboot signal transmission, information associated with each device 20, and details of the scheduled operation, such as the date and time of the operation and the user requesting the operation. Also, an input from a user, such as a technician, may be received to cancel one or more of the scheduled reboot operations. See block 124. For example, one or more of the previously designated VoIP communication devices 20 may be removed from the list of devices to execute a reboot operation, or a reboot operation scheduled to be executed by an entire batch of devices 20 may be cancelled.

Furthermore, a condition of the VoIP communication devices 20 designated to be rebooted may be sensed before the reboot signal is transmitted and after the reboot signal is transmitted. See blocks 126-128. Conditions that may be sensed include whether a VoIP communication device 20 is connected to the network, whether the device 20 is in use, and whether any errors are associated with the particular device 20, such as a failure to register with the network. By sensing one or more of these conditions before and after a reboot signal is transmitted to a particular device 20, a technician, for example, may be able to observe the effects of a reboot operation on the device 20 and potentially diagnose any failures or errors associated with the reboot.

If the reboot operation was not successful or an error was sensed after transmission of the reboot signal to a particular VoIP communication device 20, the reboot signal may be re-transmitted automatically to the device 20 which failed to reboot. See blocks 130 and 104. A reboot operation may fail for various reasons, such as a failure of the transmission to reach the designated device 20, or an error condition of the device 20 itself causing the device 20 to fail to execute the reboot operation despite receiving the signal. If the reboot signal was not transmitted the first time, or was improperly transmitted, then re-transmission of the signal to the particular VoIP communication device 20 may result in the execution of a successful reboot operation the second time, relieving a technician, for example, of trouble-shooting the error and manually attempting to retransmit the reboot signal. Re-transmission of the reboot signal may be attempted more than once following the first failed reboot, depending on the configuration of the apparatus 10.

The transmission of the reboot signal to the designated VoIP communication devices 20 may occur generally simultaneously with a user's designation of the devices 20 to be rebooted, or at a later time as defined by the time input received, as previously discussed. However, if more than a certain number of VoIP communication devices 20 are designated for reboot at the same time, the transmission of the reboot signals may be staggered automatically to prevent unnecessary loading of the network as the devices 20 attempt to re-register on the network following reboot. See block 132.

For example, a network may only have the capacity to handle requests from fifty VoIP communication devices 20 to register on the network at any given time. In that case, a designation of more than fifty devices 20 to be rebooted at the same time may result in the transmission being staggered such that some of the designated devices are rebooted first, and others are rebooted at intervals following the first batch, providing time during those intervals for the first devices rebooted to register with the network. Continuing the previous example, if one hundred VoIP communication devices 20 are designated to receive a reboot signal, and the network capacity for registration is fifty devices 20, transmission of the reboot signals may be staggered such that the signals are transmitted to one device 20 every 18 seconds, thereby evenly distributing the reboots over a 30-minute period. In this way, the VoIP communication devices 20 should not make simultaneous requests to register with the network, and the network should not be overwhelmed.

Finally, a result of the reboot operation may be reported to a designated user, such as the technician who scheduled the reboot, as shown in block 134. The report may be generated automatically as an e-mail, text message, or other form of notification and may contain varying levels of detail regarding the operation. For example, the report may provide a list of the VoIP communication devices 20 that were rebooted, the number of unsuccessful reboot attempts, and the date and time of any successful reboots for each device 20.

Figure 10:
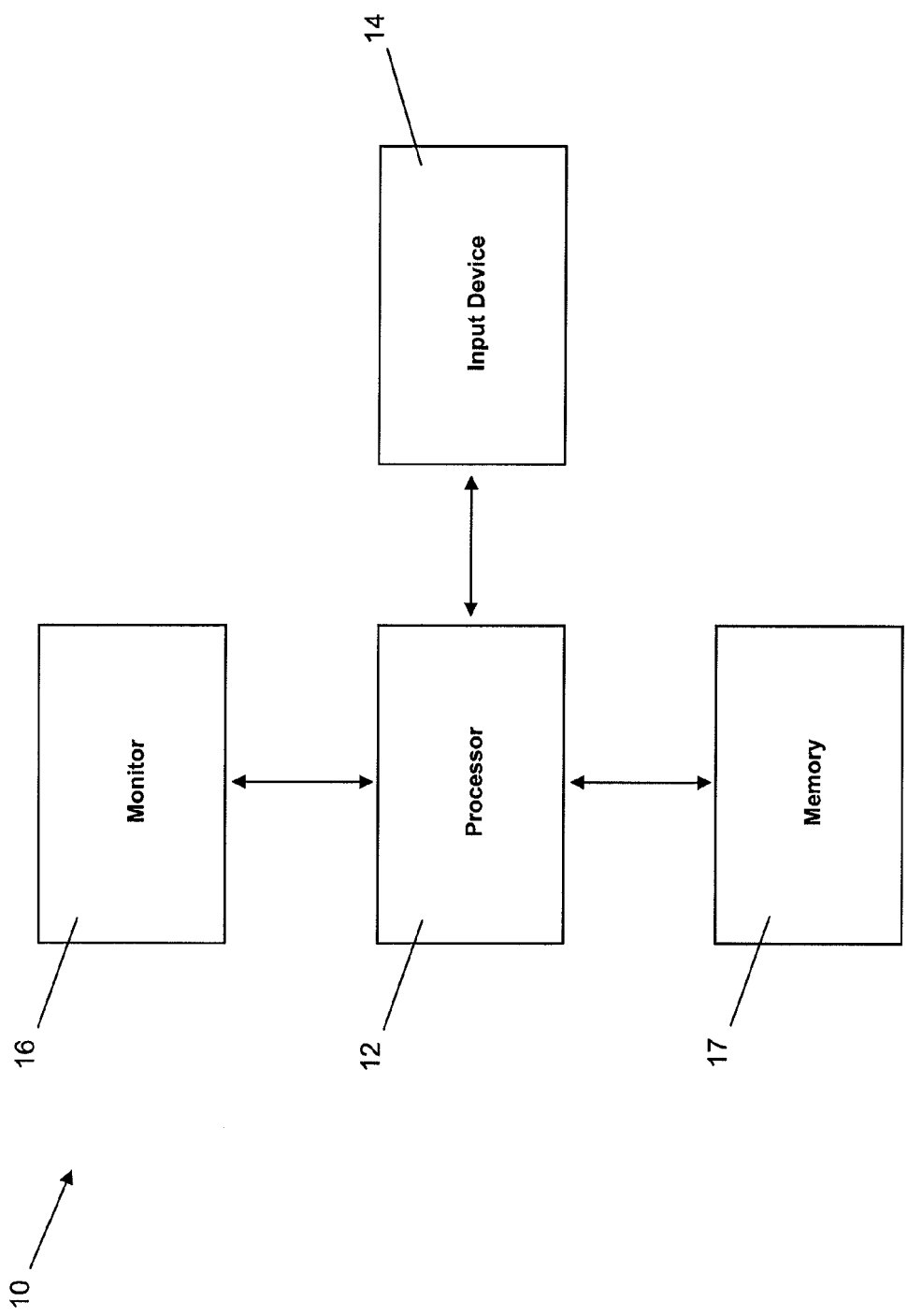
FIG. 10 is a block diagram of one embodiment of an apparatus for remotely rebooting VoIP communication devices.

It is understood that the operations described for the illustrated methods of FIG. 9 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIG. 10, for example, the executable portions may be stored in a memory 17 of the apparatus 10 such that the processor 12 may access and execute the executable portions of the computer program product in order to perform the functions described herein including, for example, those depicted in FIG. 9.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
    a processor configured to receive inputs and to communicate with a plurality of Voice over Internet Protocol (VoIP) communication devices over a packet-switching network in accordance with the inputs; and
    wherein the processor is configured to
    receive a designation input designating the plurality of VoIP communication devices for reboot, receive a time input that defines a date and time to reboot the designated VoIP communication devices,
    determine a capability of the network to handle simultaneous requests by the designated VoIP communication devices to register on the network following a reboot,
    transmit, in response to the received designation and time inputs, a reboot signal to each of the designated VoIP communication devices instructing each of the designated VoIP communication devices to reboot,
    stagger the transmission of the reboot signals to the designated VoIP communication devices in accordance with the determined capability of the network, and
    detect and report at least one of a condition of at least one of the designated VoIP communication devices before reboot of the at least one of the designated VoIP communication devices is executed and a condition of the at least one of the designated VoIP communication devices after the reboot of the at least one of the designated VoIP communication devices is executed.

2. The apparatus of claim 1 wherein the processor is further configured to sense the VoIP communication devices that are connected to the network, obtain information associated with each VoIP communication device sensed, and store a list of the VoIP communication devices sensed and at least some of the associated information.

3. The apparatus of claim 2 wherein the processor is further configured to display the list of sensed VoIP communication devices on a screen and to receive the designation input in response to the display of the list.

4. The apparatus of claim 2 wherein the processor is further configured to receive a search criteria input, search the list of sensed VoIP communication devices according to the search criteria input, and display a result of the search.

5. The apparatus of claim 4 wherein the search criteria input comprises at least one criterion selected from the group consisting of a location, an associated user, a phone number, an Internet Protocol address, and a Media Access Control address of at least one of the designated VoIP communication devices.

6. The apparatus of claim 1 wherein the processor is further configured to display a list of scheduled reboots of the designated VoIP communication devices and to receive a cancellation input deleting at least one of the scheduled reboots.

7. The apparatus of claim 1 wherein the processor is further configured to notify a user that a reboot of at least one of the designated VoIP communication devices is starting.

8. The apparatus of claim 1 wherein the processor is further configured to attempt to reboot at least one of the designated VoIP communication devices a subsequent time if an initial reboot of the at least one the designated VoIP communication devices is unsuccessful.

9. A method comprising:
receiving a designation input designating a plurality of Voice ova Internet Protocol (VoIP) communication devices connected to a network to reboot;
receiving a time input that defines a date and time to reboot the designated VoIP communication devices;
determining a capability of the network to handle simultaneous requests by the designated VoIP communication devices to register on the network following a reboot;
transmitting, in response to the received designation and time inputs, a reboot signal to each of the designated VoIP communication devices instructing each of the designated VoIP communication devices to reboot;
staggering the transmission of the reboot signals to the designated VoIP communication devices in accordance with the determined capability of the network; and
detecting and reporting at least one of a condition of at least one of the designated VoIP communication devices before reboot of the at least one of the designated VoIP communication devices is executed and a condition of the at least one of the designated VoIP communication devices after the reboot of the at least one of the designated VoIP communication devices is executed.

10. The method of claim 9 further comprising obtaining information associated with each of the designated VoIP communication, displaying a list of the designated VoIP communication devices, and displaying at least some of the associated information.

11. The method of claim 10 further comprising storing the list of the designated VoIP communication devices and the at least some of the associated information, receiving a search criteria input, and displaying another list of one or more of the designated VoIP communication devices that match the search criteria input.

12. The method of claim 9 further comprising sensing a condition of each of the designated VoIP communication devices before transmitting the reboot signals and sensing a condition of each of the designated VoIP communication devices after transmitting the reboot signals.

13. The method of claim 12 further comprising re-transmitting at least one of the reboot signals if the condition sensed after transmitting the reboot signals meets a predetermined standard.

14. The method of claim 9 further comprising displaying a list of scheduled reboots of the designated VoIP communication devices.

15. The method of claim 14 further comprising receiving an input to cancel one of the scheduled reboots.

16. A computer program product comprising a non-transitory computer readable storage medium having computer-readable program code portions stored therein, the computer-readable program code portions comprising:
a first executable portion for sensing a plurality of Voice over Internet Protocol (VoIP) communication devices connected to a network;
a second executable portion for receiving a designation input designating the plurality of VoIP communication devices for reboot;
a third executable portion for receiving a time input that defines a date and time to reboot the designated VoIP communication devices;
a fourth executable portion for determining a capability of the network to handle simultaneous requests by the designated VoIP communication devices to register on the network following a reboot;
a fifth executable portion for transmitting, in response to the received designation and time inputs, a reboot signal to each of the designated VoIP communication devices instructing each of the designated VoIP communication devices to reboot;
a sixth executable portion for staggering the transmission of the reboot signals to the designated VoIP communication devices in accordance with the determined capability of the network; and
a seventh executable portion for detecting and reporting at least one of a condition of at least one of the designated VoIP communication devises before reboot of the at least one of the designated VoIP communication devices is executed and a condition of the at least one of the designated VoIP communication devices after the reboot of the at least one of the designated VoIP communication devices is executed.

17. The computer program product of claim 16 further comprising an eighth executable portion for storing a list of the designated VoIP communication devices, obtaining information associated with each of the designated VoIP communication devices, storing a list of at least some of the associated information, receiving a search criteria input, and displaying a list of the VoIP communication devices that match the search criteria input.

18. The computer program product of claim 16 further comprising an eighth executable portion for sensing a condition of each of the designated VoIP communication devices before transmitting the reboot signals and sensing a condition of each of the designated VoIP communication devices after transmitting the reboot signals.

19. The computer program product of claim 18 further comprising a ninth executable portion for re-transmitting at least one of the reboot signals if the condition sensed after transmitting the reboot signals meets a predetermined standard.

* * * * *